(12) United States Patent
Ho

(10) Patent No.: US 9,062,195 B2
(45) Date of Patent: *Jun. 23, 2015

(54) RED PHOTOSENSITIVE RESIN COMPOSITION FOR COLOR FILTER AND APPLICATION OF THE SAME

(71) Applicant: CHI MEI CORPORATION, Tainan City (TW)

(72) Inventor: Wei-Kai Ho, Nantou County (TW)

(73) Assignee: CHI MEI CORPORATION, Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/271,445

(22) Filed: May 6, 2014

(65) Prior Publication Data
US 2014/0343185 A1    Nov. 20, 2014

(30) Foreign Application Priority Data

May 16, 2013   (TW) .............................. 102117386 U

(51) Int. Cl.
| C08F 2/46 | (2006.01) |
| C08F 2/50 | (2006.01) |
| B29C 71/04 | (2006.01) |
| A61L 2/08 | (2006.01) |
| A61L 24/00 | (2006.01) |
| C08G 61/04 | (2006.01) |
| C08L 33/24 | (2006.01) |
| C08L 33/08 | (2006.01) |

(52) U.S. Cl.
CPC ........ *C08L 33/24* (2013.01); *C08L 33/08* (2013.01)

(58) Field of Classification Search
CPC .................................. C08L 33/24; C08L 33/08
USPC ............ 522/15, 12, 7, 6, 184, 189, 71, 8, 13, 522/21, 22, 1; 520/1
See application file for complete search history.

(56) References Cited

U.S. PATENT DOCUMENTS

| 4,992,101 A * | 2/1991 | Jaffe et al. ...................... 106/498 |
| 2011/0155973 A1* | 6/2011 | Lenz et al. ..................... 252/586 |
| 2014/0346416 A1* | 11/2014 | Hsu et al. ....................... 252/586 |

FOREIGN PATENT DOCUMENTS

| JP | 11-231516 | * | 8/1999 |
| JP | 11-231516 A | | 8/1999 |
| JP | 2012-155232 | * | 3/2012 |
| WO | 2009144115 A1 | | 12/2009 |

OTHER PUBLICATIONS

Suzuki et al, JP 11-231516 Machine Translation, Aug. 27, 1999.*
Abe et al, JP 2012-155232 Machine Translation Part 1, Mar. 22, 2012.*
Abe et al, JP 2012-155232 Machine Translation Part 2, Mar. 22, 2012.*

* cited by examiner

*Primary Examiner* — Ling Choi
*Assistant Examiner* — Jessica E Whiteley
(74) *Attorney, Agent, or Firm* — CKC & Partners Co., Ltd.

(57) ABSTRACT

The present invention relates to a red photosensitive resin composition for a color filter and an application of the same. The red photosensitive resin composition includes a pigment (A), an alkali-soluble resin (B), a cationic polymerized compound (C), a cationic photo-initiator (D) and an organic solvent (E). The pigment (A) includes a first pigment (A-1), and the first pigment (A-1) is a brominated-diketo-pyrrolo-pyrrole pigment. The aforementioned red photosensitive resin composition is advantageously applied for the color filter with better brightness, contrast, temporal stability of sensitivity and development resistance.

11 Claims, 2 Drawing Sheets

RED PHOTOSENSITIVE RESIN COMPOSITION FOR COLOR FILTER AND APPLICATION OF THE SAME

RELATED APPLICATIONS

This application claims priority to Taiwan Application Serial Number 102117386, filed on May 16, 2013, which is herein incorporated by reference.

BACKGROUND

1. Field of Invention

The present invention relates to a red photosensitive resin composition for a color filter and a color filter formed by the red photosensitive resin composition. More particularly, the present invention relates a red photosensitive resin composition for a color filter having excellent brightness, contrast, development resistance, and temporal stability of sensitivity.

2. Description of Related Art

The color filters have been widely applied in the color liquid crystal display device, color fax machine, color recorder and other applications. There is an improvement in the market requirements of the color liquid crystal display device. Thus, the producing methods of the color filters are tended to variety for satisfying the aforementioned market requirements.

Red, green and blue pixels are formed on a glass substrate to produce the color filters by dyeing method, printing method, electrodeposition method, pigment dispersing method and the like. For further improving contrast of the color filter, shielding layer (black matrix) was disposed between pixels in pixel color layer.

In conventionally color filter, diketo-pyrrolo-pyrrole pigment was used for red pigment in a photosensitivity resin composition of red pixels. Conventionally diketo-pyrrolo-pyrrole pigment and C.I. Pigment Red 254 can further improve brightness of the color filter. Japanese Patent publication No. 1999-231516 and international publication No. 2009-144115 further disclosed a brominated-diketo-pyrrolo-pyrrole pigment for new red pigment.

In recent years, there are requirements of high brightness and high contrast. Thus, primary particle size of the brominated-diketo-pyrrolo-pyrrole pigment is further decreased for meeting the requirements of high brightness and high contrast.

Moreover, for satisfying the aforementioned high brightness and high contrast, a concentration of the diketo-pyrrolo-pyrrole pigment is needed to increase in the photosensitivity resin composition. However, when the high concentration diketo-pyrrolo-pyrrole pigment mixed with the conventional photo initiator, the photosensitivity resin composition has defects of bad temporal stability of sensitivity.

Furthermore, a pigment ratio of the photosensitivity resin composition is increased with the requirement of higher color saturation. However, when the pigment ratio is increased, a relatively amount of an alkali-soluble resin and a photosensitivity monomer is decreased, thereby lowing curing degree after exposing, further decreasing development resistance.

Accordingly, there is a need to improve the aforementioned disadvantages when the diketo-pyrrolo-pyrrole pigment is used for increasing the brightness and contrast of the color filter and simultaneously improving the temporal stability of sensitivity and development resistance for the requirements of the color filter.

SUMMARY

Therefore, an aspect of the present invention provides a red photosensitive resin composition for a color filter, and the red photosensitive resin composition can improve the defects of brightness, contrast, development resistance, and temporal stability of sensitivity.

Another aspect of the present invention provides a producing method of the color filter, and a pixel layer of the color filter is formed by the aforementioned red photosensitive resin composition.

A further aspect of the present invention provides a color filter produced by the aforementioned producing method.

A further aspect of the present invention provides a liquid crystal display device comprising the aforementioned color filter.

The red photosensitive resin composition comprising a pigment (A), an alkali-soluble resin (B), a cationic polymerized compound (C), a cationic photo initiator (D) and an organic solvent (E) all of which are described in details as follows.

Red Photosensitive Resin Composition for Color Filter Pigment (A)

The pigment (A) includes a first pigment having a structure of formula (I):

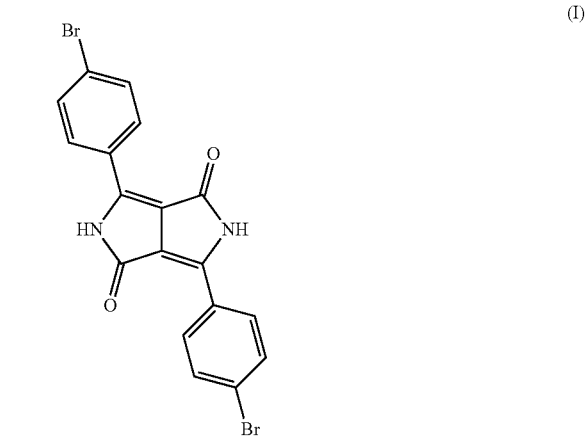 [SMILES: O=C1NC(c2ccc(Br)cc2)=C2C(=O)NC(c3ccc(Br)cc3)=C12]

The first pigment (A-1) having a structure of formula (I) is a brominated-diketo-pyrrolo-pyrrole pigment. The first pigment can be produced by a synthesized method disclosed by a conventional patent (Publication NO.: WO 2009/144115).

For example, the aforementioned producing method can be a synthesized method of succinic acid diester. 2 mole of 4-bromobenzonitrile and 1 mole of succinic acid diester were added into an inert organic solvent (such as amylene gydrate). Then, a condensation reaction is performed at 80° C. to 110° C. under an alkali metal or an alkali alcoholate to produce the alkali metal salt of diketo-pyrrolo-pyrrole compound, thereby obtaining the brominated-diketo-pyrrolo-pyrrole pigment. And then, the alkali metal of diketo-pyrrolo-pyrrole compound is protonated by water, alcohol, acid and the like. Under protonation is performed, a primary particle size can be controlled by temperature of the protonation, and a ratio and an amount of water, alcohol and acid. The aforementioned producing method is described below to illustrate the application of the present invention. The producing method of the brominated-diketo-pyrrolo-pyrrole pigment is not limited by the embodiment.

Based on the following alkali-soluble resin (B) as 100 parts by weight, an amount of the first pigment is 50 parts by weight to 500 parts by weight, preferably is 60 parts by weight to 400 parts by weight, and more preferably is 80 parts by weight to 300 parts by weight.

When the red photosensitive resin composition does not include the first pigment, the color filter has defects of bad contrast.

The pigment (A) of the present invention can selectively combine two or more second pigment (A-2) except the first pigment (A-1). The second pigment (A-2) is an organic pigment or an inorganic pigment, and preferably is a pigment having high colorability and high heat resistance.

For example, the second pigment (A-2) is diketo-pyrrolopyrrole pigment except for the first pigment (A-1); azo pigment, such as azo pigment; disazo pigment, polyazo and the like; phthalocyanine pigment, such as copper phthalocyanine, halogenated copper phthalocyanine, phthalocyanine without metal, and the like; anthraquinone pigment, such as aminoanthraquinone pigment, diamino dianthraquinone pigment, anthrapyrimidine pigment, flavanthrone pigment, anthanthrone pigment, indanthrone pigment, pyranthrone pigment, violanthrone pigment and the like; quinacridone pigment; dioxazine pigment; perynone pigment; perylene pigment; thioindigo pigment; isoindoline pigment; isoindolinone pigment; quinophthalone pigment; threne pigment; quinoline pigment; benzimidazolone pigment or metal complex pigment.

In the aforementioned examples of the second pigment (A-2), the second pigment (A-2) preferably is selected a group consisting of diketopyrrolopyrrole pigment except for the first pigment (A-1), azo pigment, anthraquinone pigment, perylene pigment, quinacridone pigment, quinoline pigment, benzimidazolone pigment and a combination thereof. Preferably, colors of the pigment (A) can easily control by adjusting a mixing ratio of the pigments that are similar the first pigment (A-1).

For example, a red pigment of the aforementioned second pigment (A-2) is C.I. Pigment Red 1, 2, 3, 4, 5, 6, 7, 8, 9, 12, 14, 15, 16, 17, 21, 22, 23, 31, 32, 37, 41, 47, 48, 48:1, 48:2, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276 and the like.

For obtaining better brightness, the red pigment preferably is C.I. Pigment Red 48:1, 122, 168, 177, 202, 206, 207, 209, 224, 242 or 254, and more preferably is C.I. Pigment Red 177, 209, 224, 242 or 254.

For example, a yellow pigment of the aforementioned second pigment (A-2) is C.I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208 and the like.

For obtaining better brightness, the yellow pigment preferably is C.I. Pigment Yellow 83, 117, 129, 138, 139, 150, 154, 155, 180 or 185, and more preferably is C.I. Pigment Yellow 83, 138, 139, 150 or 180.

For example, an orange pigment of the aforementioned second pigment (A-2) is C.I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78 and 79.

For obtaining better brightness, the orange pigment preferably is C.I. Pigment Orange 38 or 71.

For example, an inorganic pigment of the aforementioned second pigment (A-2) is metal oxide powder, such as barium sulfate, zinc oxide, lead sulfate, chrome yellow, zinc yellow, iron oxide red [red iron(III) oxide], cadmium red, ultramarine, prussian blue, chromium oxide green, cobalt green, fossil resin, titanium black, synthetic iron black, titanium dioxide, ferric ferrous oxide and the like, metal sulfate powder, metal powder and the like. For obtaining the balance of brightness and saturation, excellent coating properties, excellent sensitivity and excellent development, the inorganic pigment can combine with the organic pigment.

Based on the following alkali-soluble resin (B) as 100 parts by weight, an amount of the second pigment (A-2) is 10 parts by weight to 100 parts by weight, preferably is 20 parts by weight to 100 parts by weight, and more preferably is 40 parts by weight to 100 parts by weight.

When the red photosensitive resin composition includes the second pigment (A-2), the red photosensitive resin composition can improve the brightness of the color filter.

The red photosensitive resin composition of the present invention can further combine a dye to adjust the chrominance without lowing the heat resistance. The aforementioned description is widely known rather than focusing or mentioning them in details.

Based on the following alkali-soluble resin (B) as 100 parts by weight, an amount of the pigment (A) is 60 parts by weight to 600 parts by weight, preferably is 80 parts by weight to 500 parts by weight, and more preferably is 100 parts by weight to 400 parts by weight.

Alkali-soluble Resin (B)

The alkali-soluble resin (B) is copolymerized with ethylene unsaturated monomer having carboxylic group and other copolymeric ethylene unsaturated monomer. The ethylene unsaturated monomer having carboxylic group has one or more carboxylic groups. Preferably, the alkali-soluble resin (B) is copolymerized with 50 wt % to 95 wt % of ethylene unsaturated monomer having carboxylic group and 5 wt % to 50 wt % of other copolymeric ethylene unsaturated monomer.

The ethylene unsaturated monomer having carboxylic group can be used alone or in a combination two or more, and the ethylene unsaturated monomer having carboxylic group includes but is not limited unsaturated monocarboxylic acid, such as acrylic acid, methacrylic acid (MAA), fumaric acid, α-chloro acrylic acid, ethyl acrylic acid, cinnamic acid, 2-acrylethoxyl succinate monoester, 2-methacryloyloxyethyl succinate monoester (HOMS) and the like; unsaturated dicarboxylic acid (anhydrate), such as maleic acid, maleic anhydrate, fumaric acid, itaconic acid, itaconic anhydrate, citraconic acid, citraconic anhydrate and the like; unsaturated polycarboxylic acid (anhydrate) having three or more carboxylic acid. Preferably, the ethylene unsaturated monomer is selected from acrylic acid, methacrylic acid, 2-acrylethoxyl succinate monoester or 2-methacryloyloxyethyl succinate monoester. More preferably, the ethylene unsaturated monomer is selected from 2-acrylethoxyl succinate monoester or 2-methacryloyloxyethyl succinate monoester.

The other copolymeric ethylene unsaturated monomer can be used alone or in a combination two or more, and the other copolymeric ethylene unsaturated monomer includes but is not limited aromatic ethylene compound, such as styrene (SM), α-methyl styrene, ethylene toluene, p-chlorostyrene, methoxyl styrene and the like; maleimide compound, such as N-phenylmaleimide (PMI), N-o-hydrophenylmaleimide, N-m-hydrophenylmaleimide, N-p-hydrophenylmaleimide, N-o-methylphenylmaleimide, N-m-methylphenylmaleimide, N-p-hydrophenylmaleimide, N-o-methoxylphenylmaleimide, N-m-methoxylphenylmaleimide, N-p-methoxylphenylmaleimide, N-cyclohexylphenylmaleimide and the like; unsaturated carboxylic ester compound, such as methyl acrylate (MA), methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, iso-butyl acrylate, iso-butyl methacrylate, sec-butyl acrylate, sec-butyl methacrylate, tert-butyl acrylate, tert-butyl methacrylate, 2-hydroethyl acrylate, 2-hydroethyl methacrylate, 2-hydropropyl acrylate, 2-hydropropyl methacrylate, 3-hydropropyl acrylate, 3-hydropropyl methacrylate, 2-hydrobutyl acrylate, 2-hydrobutyl methacrylate, 3-hydrobutyl acrylate, 3-hydrobutyl methacrylate, 4-hydrobutyl acrylate, 4-hydrobutyl methacrylate, propylene acrylate, propylene methacrylate, benzyl acrylate, benzyl methacrylate (BzMA), phenyl acrylate, phenyl methacrylate, triethylene glycol methoxyl acrylate, triethylene glycol methoxyl methacrylate, dodecyl methacrylate, tetradecyl methacrylate, hexadecyl methacrylate, octadecyl methacrylate, lcosyl methacrylate, didodecyl methacrylate, dicyclopentenyloxyethyl acrylate (DCPOA) and the like; N,N-dimethyl ammo ethyl acrylate, N,N-dimethyl amino ethyl methacrylate, N,N-diethyl amino propyl acrylate, N,N-diethyl amino propyl methacrylate, N,N-dibutyl amino propyl acrylate and N-isobutyl amino ethyl methacrylate; unsaturated carboxylic epoxypropyl ester, such as epoxypropyl acrylate, epoxypropyl methacrylate and the like; carboxylic ethylene ester such as ethyl acetate, vinyl pivalate, vinyl butanoate and the like; unsaturated ether, such as methoxyethene, ethoxyethene, allyl glycidyl ether, methylpropene epoxypropyl ether and the like; nitrile ethylene compound, such as acrylonitrile, methyl acrylonitrile, α-chloro acrylonitrile, vinylidene cyanide and the like; amide compound, such as acrylamide, methyl acrylamide, α-chloro acrylamide, N-hydroethyl acrylamide, N-hydroethylmethyl acrylamide and the like; aliphatic conjugated diene compound, such as 1,3-butadiene isoprene, chlorobutadiene and the like.

Preferably, The other copolymeric ethylene unsaturated monomer is selected from styrene, N-phenylmaleimide, methyl acrylate, methyl methacrylate, 2-hydroethyl acrylate, 2-hydroethyl methacrylate, benzyl acrylate, benzyl methacrylate, dicyclopentenyloxyethyl acrylate and in a combination thereof.

When the alkali-soluble resin (B) is produced, the solvent can be used alone or in a combination two or more, and the solvent includes but is not limited (poly) alkylidene glycol monoalkyl ether, such as ethylene glycol methyl ether, ethylene glycol ethyl ether, diethylene glycol methyl ether, diethylene glycol ethyl ether, diethylene glycol n-propyl ether, diethylene glycol n-butyl ether, triethylene glycol methyl ether, triethylene glycol ethyl ether, propylene glycol methyl ether, propylene glycol ethyl ether, dipropylene glycol monomethyl ether, dipropylene glycol monoethyl ether, dipropylene glycol n-propyl ether, dipropylene glycol n-butyl ether, dipropylene glycol methyl ether, dipropylene glycol ethyl ether and the like; (poly) alkylidene glycol monoalkyl ether acetate, such as propylene glycol methyl ether acetate (PGMEA), propylene glycol ethyl ether acetate and the like; other ether, such as diethylene glycol dimethyl ether, diethylene glycol methyl ethyl ether, diethylene glycol diethyl ether, tetrahydrofuran and the like; ketone, such as methylethyl ketone, cyclohexanone, 2-pentayl ketone, 3-pentayl ketone and the like; alkyl lactate, such as 2-hydropropyl methyl propionate, 2-hydropropyl ethyl propionate and the like; other ester, such as 2-hydro-2-methyl methyl propionate, 2-hydro-2-methyl ethyl propionate, 3-methoxyl methyl propionate, 3-methoxyl ethyl propionate, 3-ethoxyl methyl propionate, ethyl 3-ethoxypropionate (EEP), ethoxyl ethyl acetate, hydroethyl acetate, 2-hydro-3-methyl methyl butyrate, 3-methyl-3-methoxyl butyl acetate, 3-methyl-3-methoxyl butyl propionate, ethyl acetate, n-propyl acetate, iso-propyl acetate, n-butyl acetate, iso-butyl acetate, n-pentyl acetate, iso-pentyl acetate, n-butyl propionate, ethyl butyrate, n-propyl butyrate, iso-propyl butyrate, n-butyl butyrate, methyl pyruvate, ethyl pyruvate, n-propyl pyruvate, methyl acetoacetate, 2-methoxyl ethyl butyrate and the like; aromatic hydrocarbon compound, such as toluene, xylene and the like; amide, such as N-methyl-2-pyrrolidone, N,N-dimethyl methyl amide, N,N-dimethyl ethyl amide and the like. Preferably, the solvent is selected from propylene glycol methyl ether acetate, ethyl 3-ethoxypropionate and a combination thereof. The (poly) alkylidene glycol monoalkyl ether is alkylidene glycol monoalkyl ether or polyalkylidene glycol monoalkyl ether. The (poly) alkylidene glycol monoalkyl ether acetate is alkylidene glycol monoalkyl ether acetate or polyalkylidene glycol monoalkyl ether acetate.

Initiators for producing the alkali-soluble resin (B) is free radical polymerized initiator. For example, the initiator is azo compound, such as 2,2'-azobis(2-methylpropionitrile), 2,2'-Azobis(2,4-dimethylvaleronitrile), 2,2'-azobis(4-methoxy-2,4-dimethylvaleronitrile), 2,2'-azobis-2-methyl butyronitrile (AMBN) and the like; peroxide, such as benzoyl peroxide and the like, Cationic Polymerized Compound (C)

The cationic polymerized compound (C) includes an oxetane compound (C-1) and an other cationic polymerized compound (C-2).

For example, in the cationic polymerized compound (C) of the present invention, the oxetane compound (C-1) and is trimethylene oxide, 3,3-dimethyl oxetane, 3,3-dichloromethyl oxetane, 3-ethyl-3-phenoxymethyl oxetane, 3-ethyl-3-hydroxymethyl oxetane, 1,4-di{[(3,3-ethyloxetane-3-yl)methoxy]methyl}benzene, di[1-ethyl(3-oxetanyl)]methyl ether [3-ethyl-3-(2-ethylhexyloxymethyl)oxetane], [3-ethyl-3-(cyclohexyloxy)methyl oxetane], {1,3-di[(3,3-ethyl oxetane-3-yl)methoxy]benzene and a derivative of the aforementioned compound, and the compound, such as products made by TOAGOSEI Co Ltd., and the trade name is OXT-121 [shown as formula (II)], OXT-213 [shown as formula (II)], OXT-221 [shown as formula (IV)], OXT-10 [shown as formula (V)], OXT-212 [shown as formula (VI)] and the like:

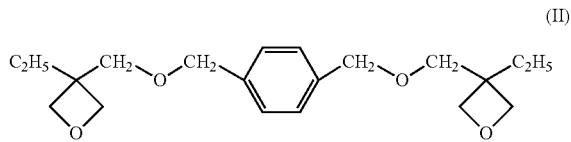

(II)

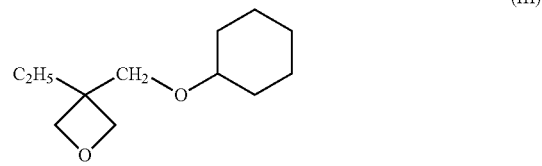

(III)

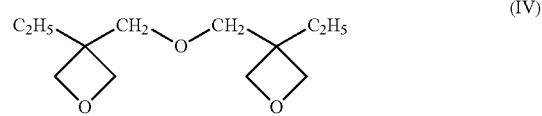

(IV)

-continued

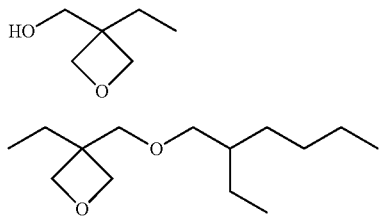

Based on the alkali-soluble resin (B) as 100 parts by weight, an amount of the oxetane compound (C-1) is 20 parts by weight to 200 parts by weight, preferably is 25 parts by weight to 180 parts by weight, and more preferably is 30 parts by weight to 160 parts by weight.

When the cationic polymerized compound (C) includes the oxetane compound (C-1), the red photosensitive resin composition has better temporal stability of sensitivity.

The aforementioned other cationic polymerized compound (C-2) can be other epoxy compound oxolane compound, cyclic acetal compound, cyclic lactone compound, thiirane compound, thietane compound, spiroorthoester compound synthesized by epoxy compound and cyclic lactone, vinyl ether compound or other unsaturated alkenyl compound.

For example, the aforementioned cationic polymerized compound (C-2) is bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxy cyclohexane carboxylate, 2-(3,4-epoxy cyclohexyl-5,5-spiro-3,4-epoxy)cyclohexane-meta-dioxane bis(3,4-epoxycyclohexylmethyl)adipate, bis(3,4-epoxy-6-methylcyclohexylmethyl)adipate, 3,4-epoxy-6-methyl-3',4'-epoxy-6-methylcyclohexane carboxylate, ε-caprolactone-modified epoxycyclohexylmethyl-3',3,4,4'-epoxy cyclohexane carboxylate, trimethylcaprolactone-modified epoxycyclohexylmethyl-3',3,4,4'-epoxy cyclohexane carboxylate, β-methyl-δ-valerolactone-modified 3,4-epoxycyclohexylmethyl-3',4'-epoxy cyclohexane carboxylate, methylenebis(3,4-epoxycyclohexane), ethylene glycol of di(3,4-epoxycyclohexylmethyl)ether, ethylene bis(3,4-epoxy cyclohexane carboxylate), epoxy cyclo hexahydro di-n-octyl phthalate, epoxy cyclo hexahydro di-2-ethylhexyl phthalate, 1,4-butanediol diglycidyl ether, 1,6-hexanediol diglycidyl ether, neopentyl glycol diglycidyl ether, trimethylolpropane triglycidyl ether, polyethylene glycol diglycidyl ether, glycerol triglycidyl ether, polypropylene glycol diglycidyl ethers; polyglycidyl ethers of polyether polyol which is formed by adding one or two or more alkylene oxide into aliphatic polyols (such as glycerol); dicarboxylate compound of long-chain aliphatic diacid; monoglycidyl ethers compound of aliphatic high alcohol; monoglycidyl ethers compound of polyether alcohol formed by adding enyloxy compound or 4-n-butyl phenol; glycidyl esters of higher fatty acid; epoxy butyl oleate; epoxy octyl oleate; epoxidized soybean oil; epoxidized linseed oil; epoxidized polybutadiene; derivative of the aforementioned compound and ethylene oxide, such as products made by Daicel Corporation, and the trade name is CEL2021P and CEL3000.

Except for the aforementioned compound, the examples of the other cationic polymerized compound (C-2) is epoxypentane, such as tetrahydrofuran, 2,3-dimethyl tetrahydrofuran and the like; cyclic acetal compound, such as trioxane, 1,3-dioxolane, 1,3,6-trioxane cyclooctane and the like; cyclic lactone compound, such as β-propiolactone, ε-caprolactone and the like; thiiran compound, such as ethylene sulfide, 1,2-propylene sulfide, thio epichlorohydrin and the like; trimethylene sulfide compound, such as 3,3-dimethyl thietane and the like; vinyl ether compound, such as ethylene glycol divinyl ether, triethylene glycol divinyl ether, trimethylolpropane ether and the like; unsaturated alkenyl compound, such as vinyl cyclohexane, isobutylene, polybutadiene and the like, and derivatives of the aforementioned compound.

The other cationic polymerized compound (C-2) can be commercial products, such as products made by Maruzen Petrochemical Co. Ltd. and the trade name is TDVE; products made by Nippon Carbide Industries Co. Ltd., and the trade name is TMPVE; products made by Union Carbide Co. Ltd., and the trade name are UVR-6100, UVR-6105, UVR-6110, UVR-6128 UVR-6200, abd UVR-6216; products made by Daicel Chemical Industries Co. Ltd., and the trade name is CEL 2021, CEL 2081, CEL 2083, CEL 2085, EPL-GT-300, EPL-GT-301, EPL-GT-302, EPL-GT-400, EPL-GT-401 and EPL-GT-403; products made by Asahi Denka Co. Ltd. and the trade name is KRM-2100, KRM-2110, KRM-2199, KRM-2200, KRM-2400, KRM-2408, KRM-2410, KRM-2490, KRM-2720 and KRM-2750; products made by ISP Co, Ltd., and the trade name is Rapi-cure DVE-3, CHVE and PEPC; products made by Japan Epoxy Resins Co. Ltd., and the trade name is Epikote 812, Epikote 828, Epikote 872, Epikote 1031 and EpikoteCT 508; and products made by AlliedSignal Co. Ltd., and the trade name is VECOMER 2010, VECOMER 2020, VECOMER 4010 and VECOMER 4020.

Based on the alkali-soluble resin (B) as 100 parts by weight, an amount of the cationic polymerized compound (C) is 30 parts by weight to 200 parts by weight, preferably is 35 parts by weight to 180 parts by weight, and more preferably is 40 parts by weight to 160 parts by weight.

When the photosensitive resin composition does not include the cationic polymerized compound (C), the photosensitive resin composition has defects of bad temporal stability of sensitivity and development resistance.

Cationic Photo-initiator (D)

When the cationic photo-initiator is irradiated by energy light, such as visible light, ultraviolet ray, X-ray, α-ray, β-ray or γ-ray, the cationic photo-initiator (C) can produce active medium, thereby inducing cationic polymerization reaction. The cationic photo-initiator (C) of the present invention preferably is a following compound having a structure of formula (VII), such as onium salt. The onium salt is irradiated by energy light to produce Lewis acid compound:

In the formula (VII), W is onium cation constructed by element. $R^1$, $R^2$, $R^3$ and $R^4$ are respectively independent, and $R^1$, $R^2$, $R^3$ and $R^4$ can be one-value organic group. In $R^1$, $R^2$, $R^3$ and $R^4$, any of two or more can bond each other, thereby forming a ring structure with W and bond with the unbond one-value organic group. a, b, c, d respectively is an integer of 0 to 3, and (a+b+c+d) is equal to a value number of W. A(−p) is p value of the onium anion, and p value is corresponding to charge number of onium cation and onium anion.

Moreover, in the formula (VII) can be the element, such as O, S, Se, Te, P, As, Sb, Bi, I, Br, Cl or —N≡N.

In the formula (VII), the preferable example of A(−p) is that $[MX_{n+p}]^{-p}$ is onium anion. M is a metal or metalloid of a central element in the halogen complex $[MX_{n+p}]$, X is a halogen atom, n is the value number of M, and p is corresponding to the charge number of onium anion. In $[MX_{n+p}]^{-p}$, the metal or metalloid is B, P, As, Sb, Fe, Sn, Bi, Al, Ca, In, Ti, Zn, Sc, V, Cr, Mn, Co and the like, and X is the halogen atom, such as F, Cl, Br, I and the like.

The aforementioned $[MX_{n+p}]^{-p}$ preferably is $BF_{4-}$, $PF_{6-}$, $SbF_{6-}$, $AsF_{6-}$, $SbCl_{6-}$ and the like.

Except for the aforementioned onium anion shown as A(-p) in the formula (VII), the onium anion can also be $CF_3SO_3^-$, $FSO_3^-$, $ClO_4^-$, p-methylbenzenesulfonic ion, trinitrotoluene ion and the like which are shown as $[MX_n(OH)]^{1-}$. (M is a metal or metalloid of a central atom in the halogen complex $[MX_n(OH)]^{1-}$, X is halogen atom and n is the value number of M.)

Preferably, the aforementioned onium salt is an aromatic onium, such as an aromatic halogen onium salt disclosed in Japanese Patent Laid-Open Publication No. 1975-151996 and No. 1975-158680; an aromatic onium salt of VIA group disclosed in Japanese Patent Laid-Open Publication No. 1975-151997, No. 1977-30899, No. 1980-125105 and No. 1981-55420; an aromatic onium salt of VA group disclosed in Japanese Patent Laid-Open Publication No. 1975-158698; an oxo sulfoxonium salt disclosed in Japanese Patent Laid-Open Publication No. 1981-8428, No. 1981-149402 and No. 1982-192429; an aromatic diazonium salt disclosed in Japanese Patent Laid-Open Publication No. 1974-17040 and a thiopyrylium alts disclosed in American Patent No. 4139655 and the like.

Except for the aforementioned compound, the cationic photo-initiator (D) can be a complex of iron/propadiene and an initiator of aluminum complex/photodegradation The cationic photo-initiator (D) of the present invention can be commercial products, such as products made by Dainippon Ink and Chemical Co. Ltd., and the trade name are Optomer SP-150, Optomer SP-151, Optomer SP-152, Optomer SP-170 and Optomer SP-172; products made by Union Carbide Co. Ltd., and the trade name are UVI-6950, UVI-6970, UVI-6974 and UVI-6990; products made by BASF Co. Ltd., and the trade name are Irgacure 250 and Irgacure 261; products made by Nippon Soda Co. Ltd., and the trade name are CI-2064, CI-2481, CI-2624 and CI-2639; products made by Midori Kagaku Co. Ltd., and the trade name are DTS-102, DTS-103, NAT-103, NDS-103, TPS-103, MDS-103, MPI-103 and BBI-103; products made by Nippon Kayaku Co. Ltd., and the trade name are PCI-020T, PCI-022T, PCI-061T and PCI-062T, and products made by San-Agro Co. Ltd., and the trade name is CPI-110A.

In the aforementioned commercial products, Optomer SP-152, Optomer SP-170, Optomer SP-172, UVI-6970, UVI-6974, Irgacure 250, CD-1012, MPI-103 and CPI-110A especially can improve sensitivity of the photosensitive composition.

Based on the aforementioned alkali-soluble resin (B) as 100 parts by weight, an amount of the cationic photo-initiator (D) is 5 parts by weight to 50 parts by weight, preferably is 6 parts by weight to 45 parts by weight, and more preferably is 7 parts by weight to 40 parts by weight.

When the red photosensitive composition does not include the cationic photo-initiator, the photosensitive resin composition has the defects of bad temporal stability of sensitivity and development resistance.

The cationic photo-initiator (D) can be used alone or in a combination of two or more.

Organic Solvent (E)

Typically, other compounds except the pigment (A) are dissolved in a suitable organic solvent (E) to form a liquid composition. Then, the aforementioned pigment (A) is uniformly mixed. The organic solvent (E) can dissolve the alkali-soluble resin (B), the cationic polymerized compound (C), and the cationic photo-initiator (D), the organic solvent (E) does not react with the aforementioned compounds, and the organic solvent (E) has a suitable volatility.

Based on the alkali-soluble resin (B) as 100 parts by weight, an amount of the organic solvent (E) is 500 parts by weight to 5000 parts by weight, preferably is 800 parts by weight to 4500 parts by weight, and more preferably is 1000 parts by weight to 4000 parts by weight.

The organic solvent (E) can be the same as the solvent used in producing the alkali-soluble resin (B) rather than focusing or mentioning them in details. Preferably, the organic solvent (E) is selected from propylene glycol mono-methyl ether acetate or ethyl 3-ethoxypropionate.

Compound Having an Ethylene Unsaturated Group (F)

The red photosensitive resin composition for the color filter of the present invention can selectively include the compound having the ethylene unsaturated group (F).

The compound having the ethylene unsaturated group (f) is a compound having at least one ethylene unsaturated group. The compound having at least one ethylene unsaturated group can be used alone or in a combination of two of more. The compound having at least one ethylene unsaturated group includes but is not limited acrylamide, acryloyl morpholine, methacryloyl morpholine, acrylate-7-amino-3,7-dimethyloctyl ester, methacrylate-7-amino-3,7-dimethyloctyl ester, isobutoxy methyl acrylamide, isobutoxy methyl methacrylamide, isobornyl ethoxy acrylate, isobornyl ethoxy methacrylate, isobornyl acrylate, isobornyl methacrylate, 2-ethyl-hexyl acrylate, 2-ethyl-hexyl methacrylate, ethyl diethylene glycol acrylate, ethyl diethylene glycol methacrylate, tertoctyl acrylamide, tertoctyl methacrylamide, diacetone acrylamide, diacetone methacrylamide, dimethylamino acrylate, dimethylamino methacrylate, dodecyl acrylate, dodecyl methacrylate, dicyclopentene ethoxyl acrylate, dicyclopentenyl ethoxyl methacrylate, dicyclopentene acrylate, dicyclopentenyl methacrylate, N,N-dimethyl acrylamide, N,N-dimethyl methacrylamide, tetrachlorophenyl acrylate, tetrachlorophenyl methacrylate, 2-tetrachlorophenoxyl ethyl acrylate, 2-tetrachlorophenoxyl ethyl methacrylate, tetrahydrofurfuryl acrylate, tetrahydrofurfuryl methacrylate, tetrabromophenyl acrylate, tetrabromophenyl methacrylate, 2-tetrabromophenoxylethyl acrylate, 2-tetrabromophenoxylethyl methacrylate, 2-trichlorophenoxylethyl acrylate, 2-trichlorophenoxylethyl methacrylate, tribromophenyl acrylate, tribromophenyl methacrylate, 2-tribromophenoxylethyl acrylate, 2-tribromophenoxylethyl methacrylate, 2-hydroxyethyl acrylate, 2-hydroxyethyl methacrylate, 2-hydroxypropyl acrylate, 2-hydroxypropyl methacrylate, vinyl caprolactam, N-vinyl pyrrollidone, ethyl phenoxyl acrylate, ethyl phenoxyl methacrylate, pentachlorophenyl acrylate, pentachlorophenyl methacrylate, pentabromophenyl acrylate, pentabromophenyl methacrylate, polyethylene glycol monoacrylate, polyethylene glycol monomethacrylate, polypropylene glycol monoacrylate, polypropylene glycol monomethacrylate, bronyl acrylate, bronyl methacrylate and the like.

The compound having two or more ethylene unsaturated group can be used alone or in a combination two or more. The compound having two or more ethylene unsaturated group includes but is not limited ethylene glycol diacrylate, ethylene glycol dimethacrylate, dicyclopentyl diacrylate, dicyclopentyl dimethacrylate, triethylene glycol diacrylate, triethylene glycol dimethacrylate, tetraethylene glycol diacrylate, tetraethylene glycol dimethacrylate, tri(2-hydroxyethyl)isocyanate diacrylate, tri(2-hydroxyethyl)isocyanate dimethacrylate, tri(2-hydroxyethylene)isocyanate triacrylate, tri(2-hydroxyethyl)isocyanate trimethacrylate, caprolactone modified tri(2-hydroxyethyl)isocyanate triacrylate, caprolactone modified tri(2-hydroxyethyl)isocyanate trimethacrylate, trihydroxymethylpropyl triacrylate, trihydroxymethylpropyl trimethacrylate, ethylene glycol (hereinafter as EO) modified trihydroxymethylpropyl triacrylate, EO modified trihydroxymethyl trimethacrylate, propylene glycol (hereinafter as PO) modified trihydroxymethylpropyl triacrylate, PO modified trihydroxymethyl trimethacrylate, triethylene glycol diacrylate, triethylene glycol trimethacrylate, neopropyl glycol diacrylate, neopropyl glycol dimethacrylate, 1,4-butyl glycol diacrylate, 1,4-butyl glycol dimethacrylate, 1,6-hexyl glycol diacrylate, 1,6-hexyl glycol dimethacrylate, pentaerythritol triacrylate, pentaerythritol trimethacrylate, pentaerythritol tetraacrylate, pentaerythritol tetramethacrylate, polyester diacrylate, polyester dimethacrylate, polyethylene glycol diacrylate, polyethylene glycol dimethacrylate, dipentaerythritol hexaacrylate (DPHA), dipentaerythritol hexamethacrylate, dipentaerythritol pentaacrylate, dipentaerythritol pentamethacrylate, dipentaerythritol tetraacrylate, dipentaerythritol tetramethacrylate, caprolactone modified dipentaerythritol hexaacrylate, caprolactone modified dipentaerythritol hexamethacrylate, caprolactone modified dipentaerythritol pentaacrylate, caprolactone modified dipentaerythritol pentamethacrylate, ditrihydromethylpropyl tetraacrylate, ditrihydromethylpropyl tetramethacrylate, EO modified bisphenol A diacrylate, EO modified bisphenol A dimethacrylate, PO modified bisphenol A diacrylate, PO modified bisphenol A dimethacrylate, EO modified hydrobisphenol A diacrylate, EO modified hydrobisphenol A dimethacrylate, PO modified hydrobisphenol A diacrylate, PO modified hydrobisphenol A dimethacrylate, PO modified tripropionin, EO modified bisphenol F diacrylate, EO modified bisphenol F dimethacrylate, polyglycidyl ether phenol acrylate, polyglycidyl ether phenol methacrylate and the like.

Preferably, the compound having ethylene unsaturated group (F) is selected from a group consisting of trihydromethylpropyl triacrylate, EO modified trihydromethylpropyl triacrylate, PO modified trihydromethylpropyl triacrylate, pentaerythritol triacrylate, pentaerythritol tetraacrylate, dipentaerythritol hexaacrylate, dipentaerythritol pentaacrylate, dipentaerythritol tetraacrylate, caprolactone modified dipentaerythritol hexaacrylate, ditrihydromethylpropyl tetraacrylate, PO modified tripropionin and a combination thereof.

Based on the alkali-soluble resin (B) as 100 parts by weight, an amount of the compound having ethylene unsaturated group is 20 parts by weight to 200 parts by weight, preferably is 25 parts by weight to 180 parts by weight, and more preferably is 30 parts by weight to 160 parts by weight.

Free Radical Photo-initiator (G)

The red photosensitive resin composition of the present invention can selectively include a free radical photo-initiator (G).

The free radical photo-initiator (G) can be used alone or in a combination of two or more. The free radical photo-initiator (G) includes but is not limited O-oxime compound, triazine compound, acetonephenone compound, biimidazole compound, benzophenone compound and the like.

The O-oxime compound can be used alone or in a combination of two or more. The O-oxime compound includes but is not limited 1-[4-(phrnyl thiol)phenyl]-heptane-1,2-dione-2-(O-phenyl oxime), 1-[4-(phrnyl thiol)phenyl]-octane-1,2-dione-2-(O-phenyl oxime), 1-[4-(benzol)phenyl]-heptane-1, 2-dione-2-(O-phenyl oxime), 1-[9-ethyl-6-(2-methylbenzol)-9H-carbazole-3-yl]-ethane ketone-1-(O-ethyl oxime), 1-[9-ethyl-6-(3-methylbenzol)-9H-carbazole-3-yl]-ethane ketone-1-(O-ethyl oxime), 1-[9-ethyl-6-phenyloxime-9H-carbazole-3-yl]-ethane ketone-1-(O-ethyl oxime), ethane ketone-1-[9-ethyl-6-(2-methyl-4-tetrahydrofuran benzol)-9H-carbazole-3-yl]-1-(O-ethyl oxime), ethane ketone-1-[9-ethyl-6-(2-methyl-5-tetrahydrofuran benzol)-9H-carbazole-3-yl]-1-(O-ethyl oxime, ethane ketone-1-[9-ethyl-6-(2-methyl-4-tetrahydrofuran methoxy benzol)-9H-carbazole-3-yl]-1-(O-ethyl oxime), ethane ketone-1-[9-ethyl-6-(2-methyl-5-tetrahydrofuran methoxyl benzol)-9H-carbazole-3-yl]-1-(O-ethyl oxime), ethane ketone-1-{9-ethyl-6-[2-methyl-4-(2,2-dimethyl-1,3-dioxygen heterocyclopentanyl)benzol]-9H-carbazole-3-yl}-1-(O-ethyl oxime), ethane ketone-1-{9-ethyl-6-[2-methyl-4-(2,2-dimethyl-1,3-dioxygen heterocyclopentanyl)methoxyl benzol]-9H-carbazole-3-yl}-1-(O-ethyl oxime) and the like.

The triazine compound can be used alone or in a combination two or more, and the triazine compound includes but is not limited 2,4-Bis(trichloromethyl)-6-(p-methoxy)styryl-s-triazine, 2,4-Bis(trichloromethyl)-6-(1-p-dimethylaminophenyl-1, 3-butadienyl)-s-triazine, 2-trichloromethyl-4-amino-6-(p-methoxy)styryl-s-triazine and the like.

The acetophenone compound can be used alone or n a combination two or more, and the acetophenone compound includes but is not limited p-dimethylamino acetophenone, α,α'-dimethoxyl azoxy acetophenone, 2,2'-dimethyl-2-phenyl acetophenone, p-methoxyl acetophenone, 2-methyl-1-(4-methyl thiol phenyl)-2-morpholine-1-acetone, 2-benzyl-2-N, N-dimethylamine-1-(4-morpholin phenyl)-1-butanone and the like.

The biimidazole compound can be used alone or in a combination of two or more, and the biimidazole compound includes but is not limited 2,2'-bis(o-chlophenyl)-4,4',5,5'-tetraphenyl biimidazole, 2,2'-bis(o-fluorophenyl)-4,4',5,5'-tetraphenyl biimidazole, 2,2'-bis(o-methylphenyl)-4,4',5,6-tetraphenyl biimidazole, 2,2'-bis(o-methoxyphenyl)-4,4',5, 5'-tetraphenyl biimidazole, 2,2'-bis(o-ethylphenyl)-4,4',5,5'-tetraphenyl biimidazole, 2,2'-bis(p-methoxylphenyl)-4,4',5, 5"-tetraphenyl 2,2'-bis(2,2',4,4'-tetramethoxylphenyl)-4,4',5, 5'-tetraphenyl biimidazole, 2,2'-bis(2-chlorophenyl)-4,4',5, 5'-tetraphenyl biimidazole, 2,2'-bis(2,4-dichlorophenyl)-4,4', 5,5'-tetraphenyl biimidazole and the like The benzophenone compound can be used alone or in a combination two or more, and the benzophenone compound includes but is not limited thiaxanthon, 2,4-diethyl thiaxanthon, thiaxanthon-4-sulfone, benzophenone, 4,4'-bis(dimethylamine)benzophenone, 4,4"-bis(diethylamine)benzophenone and the like.

Preferably, the free radical photo-initiator (G) is selected from a group consisting of 1-[4-(phrnyl thiol)phenyl]-octane-1,2-dione-2-(O-phenyl oxime), 1-[9-ethyl-6-(2-methylbenzol)-9H-carbazole-3-yl]-ethane ketone-1-(O-ethyl oxime), ethane ketone-1-[9-ethyl-6-(2-ethyl-4-tetrahydrofuran methoxyl benzol)-9H-carbazole-3-yl]-1-(O-ethyl oxime), ethane ketone-1-{9-ethyl-6-[2-methyl-4-(2,2-dimethyl-1,3-dioxygen heterocyclopentanyl)methoxyl benzol]-9H'-carbazole-3-yl}-1-(O-ethyl oxime), 2,4-Bis(trichloromethyl)-6-(p-methoxy)styryl-s-triazine, 2-benzyl-2-N,N-dimethylamine-1-(4-morpholine phenyl)-1-butanone, 2,2'-bis(2,4-dichlorophenyl)-4,4',5,5'-tetraphenyl-1,2'-biimidazole, 4,4'-bis(diethylamine)benzophenone or in a combination thereof.

Based on the alkali-soluble resin (B) as 100 parts by weight, an amount of the free radical photo initiator (G) is 5 parts by weight to 50 parts by weight, preferably is 8 parts by weight to 45 parts by weight, and more preferably is 10 parts by weight to 40 parts by weight.

The red photosensitivity resin composition can further selectively include initiators except the free radical photo initiator (G) without influencing the performance. For example, the initiator is α-diketone compound, acyloin compound, acyloin ether compound, acylphosphineoxide compound, quinone compound, halogen compound, peroxide compound and the like.

The α-diketone compound can be used alone or in a combination two or more, and the α-diketone compound includes but is not limited benzil compound, acetyl compound and the like. The acyloin compound can be used alone or in a combination two or more, and the acyloin compound includes but is not limited benzoin and the like. The acyloin ether compound can be used alone or in a combination two or more, and the acyloin ether compound includes but is not limited benzoin methylether, benzoin ethylether, benzoin isopropyl ether and the like.

The acylphosphineoxide compound can be used alone or in a combination two or more, and the acylphosphineoxide compound includes but is not limited 2,4,6-trimethyl-benzoyl diphenylphosphineoxide, bis-(2,6-dimethoxy-benzoyl)-2,4,4-trimethylbenzyl phosphineoxide and the like. The quinone compound can be used alone or in a combination two or more, and the quinone compound includes but is not limited anthraquinone, 1,4-naphthoquinone and the like. The halogen compound can be used alone or in a combination two or more, and the halogen compound includes but is not limited phenacyl chloride, tribromomethyl phenylsulfone, tris(trichloromethyl)-s-triazine and the like. The peroxide compound can be used alone or in a combination two or more, and the peroxide compound includes but is not limited di-tertbutylperoxide and the like.

When the red photosensitivity resin composition includes the compound having ethylene unsaturated group (F) and the free radical photo initiator (G), the color filter has a better development resistance.

Additive (H)

In addition, the red photosensitivity resin composition can selectively include an additive (H), such as a filling agent, a polymer compound except the alkali-soluble resin (B), an adhesion promoter, an antioxidant, an ultraviolet absorber, an anti-focculant, and the like. The additive (H) can provide the physical and chemical requirements of the red filter produced by the red photosensitive resin composition.

The additive (H) can be used alone or in a combination of two or more, and the additive (H) includes but is not limited the filler agent, such as glass, aluminum and the like; the polymer compound except the alkali-soluble resin (B), such as polyvinyl alcohol, poethylene glycol monoalkyl ether, polyfluoro alkyl acrylate, and the like; the adhesion promoter, such as vinyl trimethoxyl silane, vinyl triethoxyl silane, vinyl (2-methoxyl ethoxyl)silane, N-(2-aminoethyl)-3-aminopropylmethyl dimethoxylsilane, N-(2-aminoethyl)-3-aminopropyl trimethoxylsilane, 3-aminopropyl triethoxylsilane, 3-glycidolpropyl trimethoxylsilane, 3-glycidolpropyl methyldimethoxylsilane, 2-(3,4-epoxycyclohexyl)ethyl trimethylsilane, 3-chloropropyl methyldimethoxylsilane, 3-chloropropyl trimethoxylsilane, 3-methyl allyloxy propyl trimethoxylsilane, 3-sulfanol propyl trimethoxylsilane and the like; the antioxidant, such as 2,2-thio bis(4-methyl-6-tertbutylphenol), 2,6-bis-tertbutylphenol and the like; the ultraviolet absorber, such as 2-(3-tertbutyl-5-methyl-2-hydrophenyl)-5-chlorophenylazide, alkoxylphenyl ketone and the like; the anti-focculant, such as polyacrylate sodium and the like.

Producing Color Filter

In the producing method of the color filter, the aforementioned red photosensitive resin composition that has been uniform mixed to a solution state is coated on substrate by spin coating, cast coating, ink-jet printing, roll coating and the like. Then, the most part of the solvent is removed by reduced-pressure drying, and the residual solvent is removed by pre-bake to form a pre-bake coating film. The parameters of reduced-pressure drying and pre-bake are different according to the composition and ratio. Reduced-pressure drying is performed in 0 mmHg to 200 mmHg for 1 second to 60 seconds, and pre-bake is performed at 70° C. to 110° C. for 1 min to 15 mins. After pre-bake is performed, the pre-bake coating film is exposed under a desirable mask, and immersed in a development solution at 21° C. to 25° C. for 15 seconds to 5 mins to remove undesirable parts, thereby forming patterns. Lights in the exposing process preferable are ultraviolet light, such as g-ray, h-ray, i-ray and the like. An ultraviolet light device can be (ultra) high-pressure mercury lamp or metal halogen lamp.

The aforementioned substrate can be alkali-free glass, a Na—Ca glass, a hard glass (Pyrex glass), a quartz glass, an aforementioned glass substrate having a transparent conducting film, photoelectrical transferring device substrate of solid recoding device (such as silica substrate) and the like. Black matrix was formed on the substrate for isolating pixel color layer.

The aforementioned development solution is alkali water solution formed by alkali compounds, such as sodium hydroxide, potassium hydroxide, sodium carbonate, sodium hydrocarbonate, potassium carbonate, potassium hydrocarbonate, sodium silicate, methyl sodium silicate, ammonium solution, ethylamine, diethylamine, dimethyl ethanol amine, tetramethyl ammonium hydroxide, choline, pyrrole, piperidine, 1,8-diamine dicyc-(5,4,0)-7-undecene and the like. A concentration of the development solution is 0.001 wt% to 10 wt%, preferably is 0.005 wt% to 5 wt%, and more preferably is 0.01 wt% to 1 wt%.

When the development solution is the aforementioned alkali water solution, the pre-bake coating film is washed by water. Then, the substrate having photo curing coating film layer is dried by compressed air or compressed nitrogen.

The aforementioned substrate having photo curing coating film layer is heated at 100° C. to 280T for 1 min to 15 mins by a heating device, such as a hot plate or an oven, to remove volatile compound in the coating film, and unreacted ethylene unsaturated double bond is subjected to a curing reaction. The photosensitive resin compositions of different colors (major including red, green and blue) are subjected to the same process on desirable pixel, and the process repeats three times, so as to obtain photo curing pixel color layer of red, green and blue. The aforementioned green and blue photosensitive resin composition are produced by conventional green and blue photosensitive composition and producing method rather than focusing or mentioning them in details.

ITO film is formed on pixel color layer at 220° C. to 250° C. in vacuum. If necessarily, after the aforementioned ITO film is subjected to etching and layout, polyimide for liquid crystal alignment is coated and cured, so as to obtain the color filter for liquid crystal display device.

Producing Liquid Crystal Display Element

The liquid crystal display device of the present invention is constructed of the aforementioned color filter substrate and a driving substrate having thin film transistor (TFT).

Cell gap is firstly inserted into the aforementioned two substrates. Next, sealing agent is adhered the surrounding of the two substrates, and a gap-hole is formed. Then, liquid crystal is injected between the two substrates form the gap-hole, and the gap-hole is sealed to form liquid crystal cell. And then, polarized plates are respectively adhered on the outside of the two substrates, so as to obtain the liquid crystal display element.

Producing Color Liquid Crystal Display Device

The aforementioned liquid crystal display element having color filter is connected to a backlight element, thereby obtaining the color liquid crystal display device. The connecting method between the liquid crystal element and the backlight element is widely known rather than focusing or mentioning them in details.

Several embodiments are described below to illustrate the application of the present invention. However, these embodiments are not used for limiting the present invention. For those skilled in the art of the present invention, various variations and modifications can be made without departing from the spirit and scope of the present invention.

BRIEF DESCRIPTION OF THE DRAWINGS

The invention can be more fully understood by reading the following detailed description of the embodiment, with reference made to the accompanying drawings as follows.

DETAILED DESCRIPTION

Producing Alkali-soluble Resin (B)

Figure 1:
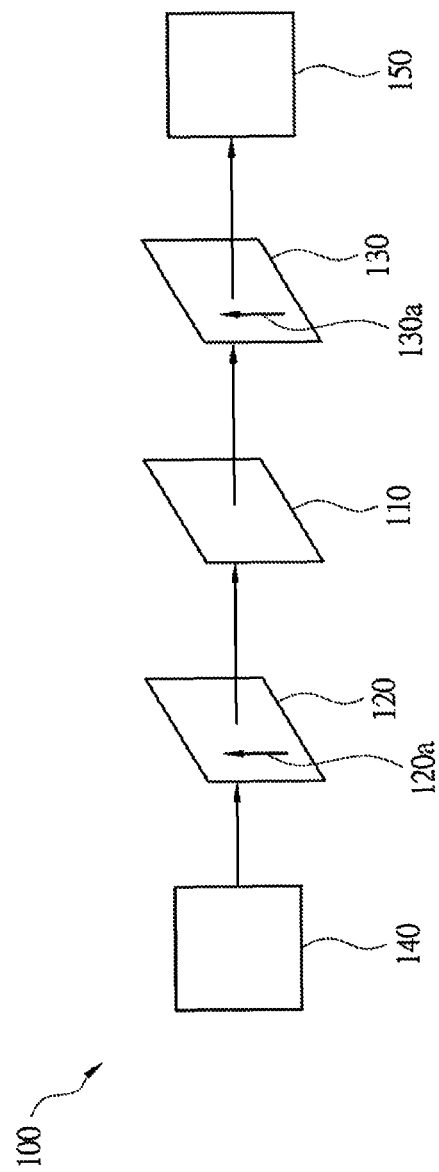
FIG. 1 is a stereo diagram of a detecting device of contrast according to the evaluated method of the present invention.

Hereinafter, the alkali-soluble resins of Synthesis Examples B-1 to B-4 were according to Table 1 as follows.

SYNTHESIS EXAMPLE B-1

A 1000 ml four-necked conical flask equipped with a nitrogen inlet, a stirrer, a heater, a condenser and a thermometer was purged with nitrogen. Then, 45 parts by weight of 2-methacryloyooxyethyl succinate monoester (hereinafter as HOMS), 40 parts by weight of styrene monomer (hereinafter as SM), 15 parts by weight of dicyclopentenyloxyethyl acrylate (hereinafter as DCPOA) and 200 parts by weight of ethyl 3-ethoxypropionate (hereinafter as EEP) were added into the conical flask, and the aforementioned monomers were added in continuously. Then, 4 parts by weight of 2,2'-azobis-2-methyl butyronitrile (hereinafter as AMBN) was dissolved in EEP. The solution was separated to five equal parts by weight, and the five parts were added into the four-necked conical flask in one hour. The temperature of the reacting solution is 160° C. After 6 hours, products were taken from the four-necked conical flask, and the solvent was removed, so as to obtain the alkali-soluble resin (B-1).

SYNTHESIS EXAMPLES B-2 to B-4

Synthesis Examples B-2 to B-4 were practiced with the same method as in Synthesis Example B-1 by using various kinds or amounts of the components for the alkali-soluble resin. The formulations and detection results thereof were listed in Table 1 rather than focusing or mentioning them in details.

Producing Red Photosensitive Resin Composition

Hereinafter, the red photosensitive resin compositions of Examples 2 to 11 and Comparative Examples 1 to 10 were according to Table 2 and Table 3 as follows.

EXAMPLE 1

50 parts by weight of the pigment (A) having the structure of formula (I) (hereinafter as A-1), 100 parts by weight of the alkali-soluble resin (B-1), 20 parts by weight of cationic polymerized compound (OXT-101; hereinafter as C-1-1), 5 parts by weight of cationic photo-initiator (ADEKA OPTOMER-SP-152; hereinafter as D-1), 20 parts by weight of dipentaerythritol hexaacrylate (hereinafter as F-1) and 5 parts by weight of 2-methyl-1-(4-methyl thiol benzyl)-2-morpholines-1-acetone (hereinafter as G-1) were added into 500 parts by weight of EEP. Then, the aforementioned compounds were uniformly mixed by a mixer, thereby obtaining the red photosensitive resin of Example 1. The resulted red photosensitive resin composition was evaluated according to the following evaluation method, and the result thereof was listed as Table 2. The evaluation methods of development resistance, contrast, brightness and temporal stability of sensitivity were described as follows.

EXAMPLES 2 to 11 AND COMPARATIVE EXAMPLES 1 to 10

Examples 2 to 11 and Comparative Examples 1 to 10 were practiced with the same method as in Example 1 by using various kinds or amounts of the components for the red photosensitive resin composition. The formulations and detection results thereof were listed in Table 2 and Table 3 rather than focusing or mentioning them in details.

Evaluation Methods

1. Development Resistance

The red photosensitive resin composition of the examples and comparative examples were respectively coated on glass substrates, and the size of the glass substrate was 100 mm×100 mm. Next, a reduced-pressure drying is subjected to the glass substrate for 30 seconds in 100 mmHg. Then, the aforementioned glass substrate is pre-baked for 2 mins at 80° C. to form a pre-bake coating film with 2.5 μm of thickness. And then, chrominance (L*, a*, b*) was detected by chrominance meter (made by Otsuka Co. Ltd., and the trade name is MCPD).

Next, the aforementioned pre-bake coating film was exposed with 100 mJ/cm$^2$ of ultraviolet light by an exposing machine made by Canon Co. Ltd., and the trade name is PLA-501F. After the exposing process, the pre-bake coating film was immersed in a development solution at 23° C. After 1 min, the pre-bake coating film was washed with water. Then, the chrominance of the pre-bake coating film was detected again, and a difference of the chrominance (ΔEab*) was calculated according to the following (VIII). When the difference of the chrominance was smaller, the development resistance of the red photosensitive resin composition was better. An evaluation was made according to the following criterion:

$$\Delta Eab^* = [(\Delta L)^2 + (\Delta a)^2 + (\Delta b)^2]^{1/2} \qquad \text{(VIII)}$$

⊚: ΔEab*≤2
○: 2≤ΔEab*<4
Δ: 4≤ΔEab*<6
X: 6≤ΔEab*

2. Contrast

The red photosensitive resin composition of the examples and comparative examples were respectively coated on glass substrates, and the size of the glass substrate was 100 mm 100 mm. Next, a reduced-pressure drying is subjected to the glass substrate for 30 seconds in 100 mmHg. Then, the aforementioned glass substrate is pre-baked for 3 mins at 80° C. to form a pre-bake coating film with 2.5 μm of thickness. Next, the aforementioned pre-bake coating film was exposed with 300 mJ/cm² of ultraviolet light by an exposing machine made by Canon Co. Ltd., and the trade name is PLA-501F. After the exposing process, the pre-bake coating film was immersed in a development solution at 23° C. After 2 min, the pre-bake coating film was washed with water. A post-bake was performed to the pre-bake coating film at 200° C. for 80 mins, so as to obtain red photosensitive resin layer with 2.0 μm of thickness on the glass substrate.

Figure 2:
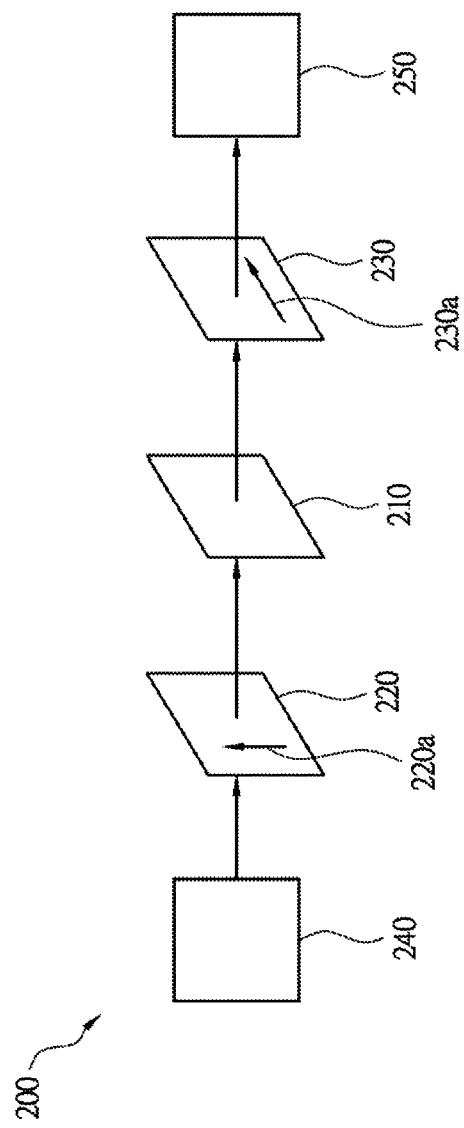
FIG. 2 is another stereo diagram of a detecting device of contrast according to the evaluated method of the present invention.

Luminance of the red photosensitive resin layer with 2.0 μm of thickness was detected by detecting device illustrated in FIG. 1 and FIG. 2, and a ratio of the luminance was calculated. Referring to FIG. 1, which is a stereo diagram of a detecting device of contrast according to the evaluated method of the present invention. In detecting device 100, the aforementioned red photosensitive resin layer 110 was disposed between two polarized plates 120 and 130, and the light emitted from the light source 140 passed through the polarized plate 120, the red photosensitive resin layer 110 and the polarized plate 130 in sequence. Then, the luminance (cd/cm²) of the light passed through the polarized plate 130 was detected by a luminance meter 150 (made by Topcon Co. Ltd., and the trade name is BM-5A).

A polarized direction 120a of the polarized plate 120 was paralleled to a polarized direction 130a of the polarized plate 130. The luminance detected by the device 100 is A. A detecting device 200 illustrated in FIG. 2 was similar to the detecting device 100 illustrated in FIG. 1, and the difference is that a polarized direction 220a of a polarized plate 220 is perpendicular to a polarized direction 230a of a polarized plate 230 in detecting device 200. A luminance detected by device 200 is B.

Then, the contrast of the red photosensitive resin composition was calculated according to the following formula (IX), and an evaluation was made according to the following criterion:

$$\text{Contrast} = \frac{\text{Luminance } A}{\text{Luminance } B} \quad (IX)$$

◎: 1500 ≦ contrast

○: 1200 ≦ contrast < 1500

△: 900 ≦ contrast < 1200

✕: contrast < 900

3. Brightness

The aforementioned red photosensitive resin layer with 2.0 μm of thickness in the evaluated method of contrast is exposed by C light source (color temperature is 6770 K), and chrominance coordinate (x, y) and brightness (Y) of the red photosensitivity resin layer were detected by the chrominance meter (made by Otsuka Co. Ltd., and the trade name is MCPD) with 2 degree of view angle. The chrominance coordinate y) was defined by international commission on illumination (CIE). When Y was bigger, the brightness of the red photosensitivity resin layer was higher. An evaluation if the result Y was made according to the following criterion:

◎: 50≦Y

○: 45≦Y<50

△: 35≦Y<45

✕: Y<35

4. Temporal Stability of Sensitivity

A size ($CD_i$) of a red pattern of an exposed area in the red photosensitivity of examples and comparative examples was measured by a scanning electron microscope (made by Hitachi Co. Ltd., and the trade name is S-9260). Then, the red photosensitivity resin layer was disposed at 45° C. After 3 days, a size ($CD_f$) was measured by the aforementioned scanning electron microscope. A difference of the size (ΔCD) was calculated according to the following formula (X), and an evaluation was made according to the following criterion:

$$\Delta CD = CD_i - CD_f \quad (X)$$

◎: CD≦002 μm

○: 0.02 μm<ΔCD≦0.05 μm

△: 0.05 μm<ΔCD≦0.07 μm

✕: 0.07 μm<ΔCD)

According to Table 2 and Table 3, when the pigment (A) of the red photosensitivity resin composition includes the first pigment (A-1), the red photosensitivity resin composition has a better contrast, and when the pigment (A) includes the second pigment (A-2), the second pigment (A-2) can improve the brightness of the red photosensitivity resin composition.

Moreover, when the red photosensitivity resin composition includes the cationic polymerized compound (C), the red photosensitivity resin composition has a good temporal stability of sensitivity and development resistance. When the cationic polymerized compound (C) includes the oxetane compound (C-1), the red photosensitivity resin composition has a better temporal stability of sensitivity. When the red photosensitivity resin composition includes cationic photo-initiator (D), the temporal stability of sensitivity and the development resistance of the red photosensitivity resin composition are better.

The red photosensitivity resin composition includes the compound having ethylene unsaturated group (F) and the free radical photo-initiator (G), the red photosensitivity resin composition can have better development resistance.

It should be supplemented that, although specific compounds, components, specific reactive conditions, specific processes, specific evaluation methods or specific equipments are employed as exemplary embodiments of the present invention, for illustrating the photosensitive resin composition and the application of the same of the present invention. However, as is understood by a person skilled in the art instead of limiting to the aforementioned examples, the photosensitive resin composition and the application of the same of the present invention also can be manufactured by using other compounds, components, reactive conditions, processes, analysis methods and equipment without departing from the spirit and scope of the present invention.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 1

| Synthesis Example | Composition (parts by weight) | | | | | | | | | | Polymerized Parameter | | |
|---|---|---|---|---|---|---|---|---|---|---|---|---|---|
| | Monomer for Copolymerization | | | | | | | Initiator | | Solvent | Method of Adding Monomer | Reacting temperature (°C.) | Polymerized Time (hr) |
| | HOMS | MAA | SM | DCPOA | BzMA | PMI | MA | AMBN | ADVN | EEP | | | |
| B-1 | 45 | | 40 | 15 | | | | 4 | | 200 | Continuously | 100 | 6 |
| B-2 | | 35 | | | 45 | 5 | 15 | 4.5 | | 200 | Added | 105 | 6 |
| B-3 | 20 | 20 | 20 | | 20 | | 20 | 4 | | 200 | | 100 | 5.5 |
| B-4 | 30 | | 15 | 15 | 20 | | 20 | | 4 | 200 | | 100 | 6 |

HOMS 2-methacryloyloxyethyl succinate monoester
MAA methacrylic acid
SM styrene monomer
DCPOA dicyclopentenyloxyethyl acrylate
BzMA benzyl methacrylate
PMI N-phenylmaleimide
MA methyl acrylate
AMBN 2,2'-azobis-2-methyl butyronitrile
ADVN 2,2'-azobis(2,4-dimethylvaleronitrile)
EEP ethyl 3-ethoxypropionate

TABLE 2

| Composition (Parts by Weight) | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Pigment (A) | A-1 | Formula (I) | 50 | 100 | 200 | 300 | 400 | 500 | 50 | 100 | 200 | 350 | 500 |
| | A-2 | A-2-1 | | | | | | | 10 | | | 50 | 100 |
| | | A-2-2 | | | | | | | | 30 | | 30 | |
| | | A-2-3 | | | | | | | | | 50 | | |
| Alkali-soluble Resin (B) | B-1 | | | 100 | | | 100 | | | | 30 | | |
| | B-2 | | | | 100 | | | 100 | | | 70 | | 30 |
| | B-3 | | | | | 100 | | | 100 | | | 50 | 70 |
| | B-4 | | | | | | | | | 100 | | 50 | |
| Cationic Polymerized Compound (C) | C-1 | C-1-1 | 20 | | | | 200 | 100 | | | 100 | | |
| | | C-1-2 | | 50 | | | | 100 | | | | 200 | |
| | | C-1-3 | | | 100 | | | | | 20 | | | |
| | | C-1-4 | | | | 150 | | | | | 30 | | |
| | C-2 | C-2-1 | | | | | | | | 10 | 20 | | |
| | | C-2-2 | | | | | | | | 20 | | | 100 |
| Cationic Photo-initiator (D) | D-1 | | 5 | | | | 50 | 30 | | | 10 | | |
| | D-2 | | | 20 | | | | | 20 | 10 | | 40 | 20 |
| | D-3 | | | | 30 | | | | | | 15 | 20 | 30 |
| | D-4 | | | | | 40 | | | | | 20 | | |
| Organic Solvent (E) | E-1 | | 500 | 1000 | 2000 | 3000 | 4000 | 5000 | | 500 | | 2000 | |
| | E-2 | | | | | | | | 1000 | 500 | 2500 | 3000 | 5000 |
| Compound Having Ethylene Unsaturated Group (F) | F-1 | | 20 | | | | | | 100 | | | | |
| | F-2 | | | | | | | | | 200 | | | |
| Free Radical Photo-initiator (G) | G-1 | | 5 | | | | | | 10 | 30 | | | |
| | G-2 | | | | | | | | | 20 | | | |
| | G-3 | | | | | | | | 10 | | | | |
| Additive (H) | H-1 | | | | | | 1 | | | | | | |
| | H-2 | | | | | | | | | | | 5 | |
| Evaluation Method | Development Resistance | | ◎ | ○ | ○ | ○ | ○ | ○ | ◎ | ◎ | ○ | ○ | ○ |
| | Contract | | ◎ | ◎ | ◎ | ◎ | ◎ | ◎ | ◎ | ◎ | ◎ | ◎ | ◎ |
| | Brightness | | ○ | ○ | ○ | ○ | ○ | ○ | ◎ | ◎ | ◎ | ◎ | ◎ |

TABLE 2-continued

| Composition (Parts by Weight) | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Temporal Stability of Sensitivity | ◎ | ◎ | ◎ | ◎ | ◎ | ◎ | ◎ | ◎ | ◎ | ◎ | ○ |

A-2-1 C.I. Pigment Red 254
A-2-2 C.I. Pigment Yellow 180
A-2-3 C.I. Pigment Orange 71
C-1-1 OXT-101 (made by Toagosei Co. Ltd.)
C-1-2 OXT-121 (made by Toagosei Co. Ltd.)
C-1-3 OXT-213 (made by Toagasei Co. Ltd.)
C-1-4 OXT-221 (made by Toegosei Co. Ltd.)
C-2-1 TDVE (made by Maruzen Petrochemical Co. Ltd.)
C-2-2 TMPVE (made by Nippon Carbide Industries Co. Ltd.)
D-1 ADEKA OPTOMER-SP-152 (made by Asahi Denka Co. Ltd.)
D-2 Irgacure 261 (made by BASF Co. Ltd.)
D-3 UVI-6974 (made by Union Carbide Co. Ltd.)
D-4 PCI-062T (made by San-Apro Co. Ltd.)
E-1 ethyl 3-ethoxypropionate
E-2 propylene glycol methyl ether acetate
F-1 dipentaerythritol hexaacrylate (made by Toagosei Co. Ltd.)
F-2 trihydromethylpropyl triacrylate
G-1 2-methyl-1-(4-methyl thiol benzyl)-2-morpholines-1-acectone
G-2 2,2'-bis(2,4-dichlorophenyl)-4,4',5,5'-tetraphenyl diimidazole
G-3 4,4'-bis(diethylamino) benzophenone
H-1 (3-mercaptopropyl)trimethoxysilane
H-2 alkoxyl phenyl ketone

TABLE 3

| Composition (Parts by Weight) | | | 1 | 2 | 3 | 4 | 5 | 6 | 7 | 8 | 9 | 10 |
|---|---|---|---|---|---|---|---|---|---|---|---|---|
| Pigment (A) | A-1 | Formula (I) | | 100 | 200 | | 300 | | | | 100 | |
| | A-2 | A-2-1 | 100 | | | 100 | | 80 | 70 | 100 | | 100 |
| | | A-2-2 | | | | | | 20 | | | | |
| | | A-2-3 | | | | | | | 30 | | | |
| Alkali-soluble Resin (B) | B-1 | | | 100 | | | | 100 | | 100 | | |
| | B-2 | | | | 100 | | | | 100 | | 100 | |
| | B-3 | | | | | 100 | | | 100 | | | |
| | B-4 | | | | | | 100 | | | | | 100 |
| Cationic Polymerized Compound (C) | C-1 | C-1-1 | 30 | | | | 50 | | | 30 | 40 | 50 |
| | | C-1-2 | | 40 | | | | | | | | |
| | | C-1-3 | | | | | | | | | | |
| | | C-1-4 | | | | | | | | | | |
| | C-2 | C-2-1 | 30 | | | 50 | | | | | | |
| | | C-2-2 | | 40 | | | | | | | | |
| Cationic Photo-initiator (D) | D-1 | | 10 | | | | | | | 10 | | |
| | D-2 | | | | 20 | | | | | | | |
| | D-3 | | | | | | | | 30 | | | |
| | D-4 | | | | | | | | | | | |
| Organic Solved (E) | E-1 | | 1000 | | 2000 | 500 | 3000 | | 1000 | 1000 | | 500 |
| | E-2 | | | 1000 | | 500 | | 1000 | | | 1000 | 500 |
| Compound Having Ethylene Unsaturated Group (F) | F-1 | | | | | | 100 | | | | | |
| | F-2 | | | | | | | | 150 | | | |
| Free Radical Photo-initiator (G) | G-1 | | | | | | | 20 | 30 | | | |
| | G-2 | | | | | | | | 10 | | | |
| | G-3 | | | | | | | | | | | |
| Additive (H) | H-1 | | | | | | | | | | | |
| | H-2 | | | | | | | | | | | |
| Evaluation Method | Development Resistance | | ○ | X | X | X | Δ | X | Δ | ○ | X | X |
| | Contrast | | X | ○ | ○ | X | ○ | X | X | X | ○ | X |
| | Brightness | | ○ | ○ | ○ | ○ | ○ | ○ | ○ | ○ | ○ | ○ |

TABLE 3-continued

| Composition (Parts by Weight) | Example | | | | | | | | | |
|---|---|---|---|---|---|---|---|---|---|---|
| | 1 | 2 | 3 | 4 | 5 | 6 | 7 | 8 | 9 | 10 |
| Temporal Stability of Sensitivity | ◯ | X | X | X | X | X | X | ◯ | X | X |

A-2-1 C.I. Pigment Red 254
A-2-2 C.I. Pigment Yellow 180
A-2-3 C.I. Pigment Orange 71
C-1-1 OXT-101 (made by Toagosei Co. Ltd.)
C-1-2 OXT-121 (made by Toagosei Co. Ltd.)
C-1-3 OXT-213 (made by Toagosei Co. Ltd.)
C-1-4 OXT-221 (made by Toagosei Co. Ltd.)
C-2-1 TDVE (made by Maruzen Petrochemical Co. Ltd.)
C-2-2 TMPVE (made by Nippon Carbide Industries Co. Ltd.)
D-1 ADEKA OPTOMER-SP-152 (made by Asahi Denka Co. Ltd.)
D-2 Irgacure 261 (made by BASF Co. Ltd.)
D-3 UVI-6974 (made by Union Carbide Co. Ltd.)
D-4 PCI-062T (made by San-Apro Co. Ltd.)
E-1 ethyl 3-ethoxypropionate
E-2 propylene glycol methyl ether acetate
F-1 dipentaerythritol hexaacrylate (made by Toagosei Co. Ltd.)
F-2 trihydromethylpropyl triacrylate
G-1 2-methyl-1-(4-methyl thiol benzyl)-2-morpholines-1-acetone
G-2 2,2'-bis(2,4-dichlorophenyl)-4,4',5,5'-tetraphenyl diimidazole
G-3 4,4'-bis(diethylamino) benzophenone
H-1 (3-mercaptopropyl)trimethoxysilane
H-2 alkoxyl phenyl ketone

What is claimed is:

1. A producing method of a color filter, comprising a pixel layer formed by a red photosensitive resin composition for the color filter, wherein the red photosensitive resin composition comprises:
   a pigment (A);
   an alkali-soluble, resin (B);
   a cationic polymerized compound (C), which includes an oxetane compound (C-1);
   a cationic photo-initiator (D); and
   an organic solvent (E),
   wherein the pigment (A) includes a first pigment (A-1) having a structure of formula (I)

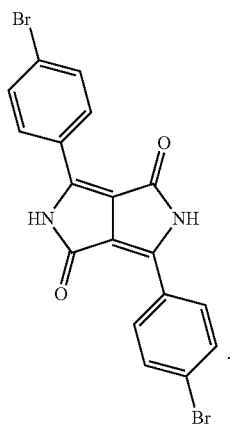

(I)

2. The producing method of a color filter of claim 1, based on the alkali-soluble resin (B) as 100 parts by weight, an amount of the pigment (A) is 60 parts by weight to 600 parts by weight, an amount of the first pigment (A-1) is 50 parts by weight to 500 parts by weight, an amount of the cationic polymerized compound (C) is 30 parts by weight to 200 parts by weight, an amount of the cationic photo-initiator (D) is 5 parts by weight to 50 parts by weight, and an amount of the organic solvent (E) is 500 parts by weight to 5000 parts by weight.

3. The producing method of a color filter of claim 1, wherein the pigment (A) further comprises a second pigment (A-2) except for the first pigment (A-1), and the second pigment (A-2) is selected from a group consisting of a diketopyrrolo-pyrrole pigment, an azo pigment, an anthraquinone pigment, a perylene pigment, a quinacridone pigment, a benzimidazolone pigment, a quinoline pigment and a combination thereof.

4. The producing method of a color filter of claim 3, based on the alkali-soluble resin (B) as 100 parts by weight, an amount of the second pigment (A-2) is 10 parts by weight to 100 parts by weight.

5. The producing method of a color filter of claim 1, based on the alkali-soluble resin (B) as 100 parts by weight, an amount of the oxetane compound (C-1) is 20 parts by weight to 200 parts by weight.

6. The producing method of a color filter of claim 1, further comprising a compound having an ethylene unsaturated group (F).

7. The producing method of a color filter of claim 6, based on the alkali-soluble resin (B) as 100 parts by weight, an amount of the compound having the ethylene unsaturated group (F) is 20 parts by weight to 200 parts by weight.

8. The producing method of a color filter of claim 6, further comprising a free-radical photo-initiator (G).

9. The producing method of a color filter of claim 8, based on the alkali-soluble resin as 100 parts by weight, an amount of the free-radical photo-initiator (G) is 5 parts by weight to 50 parts by weight.

10. A color filter produced by the producing method of claim 1.

11. A liquid crystal display device comprising the color filter of claim 1.

* * * * *